(12) United States Patent
Fukutani

(10) Patent No.: US 9,630,808 B2
(45) Date of Patent: Apr. 25, 2017

(54) MISSING FOOTSTEP DETECTION DEVICE FOR PASSENGER CONVEYOR

(71) Applicant: MITSUBISHI ELECTRIC CORPORATION, Chiyoda-ku (JP)

(72) Inventor: Toshiyuki Fukutani, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/038,518

(22) PCT Filed: Jan. 6, 2014

(86) PCT No.: PCT/JP2014/000001
§ 371 (c)(1),
(2) Date: May 23, 2016

(87) PCT Pub. No.: WO2015/102031
PCT Pub. Date: Jul. 9, 2015

(65) Prior Publication Data
US 2016/0304323 A1    Oct. 20, 2016

(51) Int. Cl.
*B66B 29/00*    (2006.01)
*B66B 27/00*    (2006.01)
*G05B 19/042*   (2006.01)

(52) U.S. Cl.
CPC .............. *B66B 29/00* (2013.01); *B66B 27/00* (2013.01); *B66B 29/005* (2013.01); *G05B 19/042* (2013.01); *G05B 2219/2621* (2013.01)

(58) Field of Classification Search
CPC .............................. B66B 29/005; B66B 29/00
See application file for complete search history.

(56) References Cited

U.S. PATENT DOCUMENTS 5,096,040 A * 3/1992 Wente .................. B66B 29/005
                                                                198/323
5,316,121 A * 5/1994 Zaharia ................ B66B 29/005
                                                                198/323
(Continued)

FOREIGN PATENT DOCUMENTS

| CN | 102583145 A | 7/2012 |
| JP | 1-88693 U   | 6/1989 |
| JP | 3-192091 A  | 8/1991 |

(Continued)

OTHER PUBLICATIONS

International Search Report Issued Apr. 8, 2014 in PCT/JP2014/000001 Filed Jan. 6, 2014.

(Continued)

*Primary Examiner* — Thomas Randazzo
(74) *Attorney, Agent, or Firm* — Oblon, McClelland, Maier & Neustadt, L.L.P.

(57) ABSTRACT

A missing footstep detection device for a passenger conveyor is installed in a passenger conveyor including a rail formed so as to have a linear portion and a curved portion, installed in a building, footsteps endlessly coupled at a regular interval, guided by the rail, and a roller mounted to each of the footsteps to roll in contact with the rail. The detection device includes a detection member having a first end side and a second end side, that is pivotally supported about a shaft passing through an intermediate portion between the first end side and the second end side and parallel to a direction of a center shaft of rolling of the roller, and is disposed above the linear portion of the rail so that the first end side can make contact with an outer peripheral surface of the roller rolling on an upper surface of the linear portion of the rail, a biasing means to bias the first end side to rotate toward the linear rail beneath the first end side, and a switch provided to transmit a signal in accordance with the rotation of the detection member due to the biasing.

20 Claims, 3 Drawing Sheets

(56) References Cited

U.S. PATENT DOCUMENTS

| | | | |
|---|---|---|---|
| 6,666,319 B2* | 12/2003 | Balzer-Apke | B66B 29/005 198/322 |
| 8,387,772 B2* | 3/2013 | Nagao | B66B 29/005 198/321 |
| 8,960,407 B2* | 2/2015 | Braasch | B66B 25/003 198/323 |
| 8,997,968 B2* | 4/2015 | Braasch | B66B 29/005 198/322 |
| 2003/0000798 A1* | 1/2003 | Williams | B66B 25/00 198/321 |
| 2011/0011700 A1* | 1/2011 | Plathin | B66B 29/005 198/323 |

FOREIGN PATENT DOCUMENTS

| | | | |
|---|---|---|---|
| JP | 4-361982 A | 12/1992 | |
| JP | 5-193887 A | 8/1993 | |
| JP | 6-211480 A | 8/1994 | |
| JP | 10-7191 A | 1/1998 | |
| JP | 2004-69077 A | 3/2004 | |
| JP | 2012-134104 A | 9/2012 | |
| JP | 2012-246112 A | 12/2012 | |
| JP | 2013-116815 | 6/2013 | |

OTHER PUBLICATIONS

Office Action issued Oct. 4, 2016 in Japanese Patent Application No. 2015-555852 (with English translation).
Chinese Office Action dated Jan. 12, 2017, issued in Chinese Patent Application No. 201480072296.6 (with English translation).

* cited by examiner

MISSING FOOTSTEP DETECTION DEVICE FOR PASSENGER CONVEYOR

TECHNICAL FIELDS

The present invention relates to a missing footstep detection device for a passenger conveyor, especially to a detection device which detects an opening between footsteps caused by the loss of a footstep.

BACKGROUND ART

In a passenger conveyor, a plurality of footsteps, endlessly coupled at a regular interval, are circularly driven while being guided by rails. In a normal operation, the footsteps are driven so that adjacent footsteps have no opening between them to be continuous with each other at portions where passengers ride on. Footsteps may, however, accidentally drop off from the rail, or may be partly taken off in maintenance. In such cases, one or more footsteps become missing at a portion where passengers ride on and an opening arises in footsteps, which creates a wide interval between the adjacent footsteps.

There is a detection device which detects an arising of an opening caused by the loss of a footstep. The detection device has a detection member beneath the footsteps which are moving toward the boarding area, and keeps rollers mounted to the detection member in contact with the footsteps elastically. When there is an opening between the footsteps, the detection member depresses a detection switch by rocking in excess of a predetermined angle. Receiving a signal outputted from the detection switch, an operation control device stops the operation of the passenger conveyor. In this way, an opening is prevented from arising between the footsteps at the boarding area to ensure passenger safety.

PRIOR ART REFERENCE

Patent Document

Patent Document 1: Japanese Patent Application Publication No: 2012-184104 (FIG. 9)

SUMMARY OF INVENTION

Problems to be Solved by the Invention

Note that the portion of the moving footsteps opposing the detection member has a concave-convex shape. It is needed to mount rollers to the detection member in order to make the detection member elastically contact, via the roller, with the concave-convex shaped footsteps. Therefore, a conventional missing footstep detection device for a passenger conveyor takes a complicated structure with many parts, which leads not only to time-consuming assembly and maintenance but also to parts replacement requirements caused by damaged rollers.

The present invention is made to solve the problems described above and to provide a missing footstep detection device for a passenger conveyor which can detect an opening in footsteps with simple structure, and is easy for assembly and maintenance.

Means for Solving the Problems

A missing footstep detection device for a passenger conveyor according to the present invention is installed in a passenger conveyor including a rail formed so as to have a linear portion and a curved portion, installed in a building, footsteps endlessly coupled at a regular interval, guided by the rail, and a roller mounted to each of the footsteps to roll in contact with the rail. The detection device includes a detection member having a first end side and a second end side, that is pivotally supported about a shaft passing through an intermediate portion between the first end side and the second end side and parallel to a direction of a center shaft of rolling of the roller, and is disposed above the linear portion of the rail so that the first end side can make contact with an outer peripheral surface of the roller rolling on an upper surface of the linear portion of the rail, a biasing means to bias the first end side to rotate toward the linear rail beneath the first end side, and a switch provided to transmit a signal in accordance with the rotation of the detection member due to the biasing.

The first end side is biased to rotate toward the linear rail beneath the first end side due to a biasing means. The first end side cannot rotate toward the rail therebeneath because the first end side gets in contact with the outer peripheral surface of the roller which is rolling on the upper surface of the linear rail beneath the first end side. While the roller is rolling on the upper surface of the linear rail at a regular interval, the first end side is kept in a state where it cannot rotate toward the rail therebeneath because the first end side gets in contact with the outer peripheral surface of the rollers one after another. Because the roller has a cylindrical shape, the outer peripheral surface is always of the same round shape even if it rolls. Also, the roller moves linearly while rolling in contact with the linear rail. Therefore, the first end side, being kept from rotating, gets in contact with the portion of the same round shape of each roller, which makes the contact between the first end side and the roller smooth.

While the roller is rolling on the upper surface of the linear rail at a longer interval than a regular interval, once the roller having been in contact with the first end side has passed through, the next roller will not come at the regular interval. Therefore, the first end side comes out of contact with the outer peripheral surface, and rotates, biased by the biasing means, toward the rail therebeneath. In accordance with the rotation, the switch transmits a signal.

Effects of the Invention

According to the present invention, a missing footstep detection device for a passenger conveyor which can detect an opening in footsteps with simple structure and is easy for assembly and maintenance can be obtained.

EMBODIMENTS FOR CARRYING OUT THE INVENTION

Embodiment 1

Figure 1:
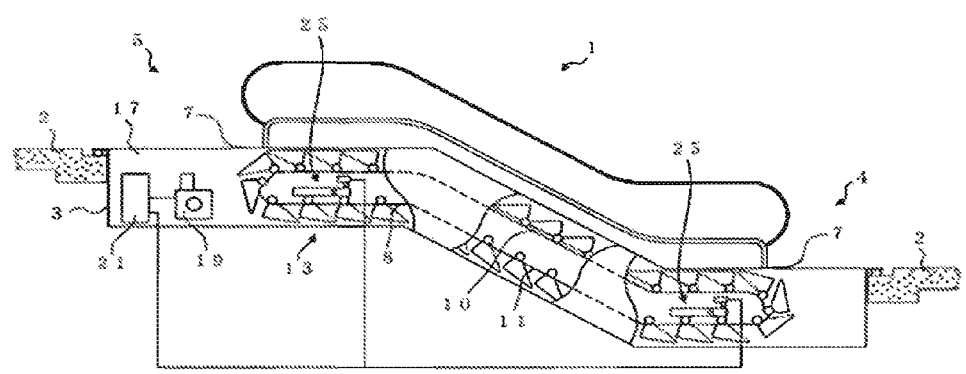
FIG. 1 is a diagram of an overall configuration of a missing footstep detection device for a passenger conveyor which shows Embodiment 1 of the invention.
Figure 2:
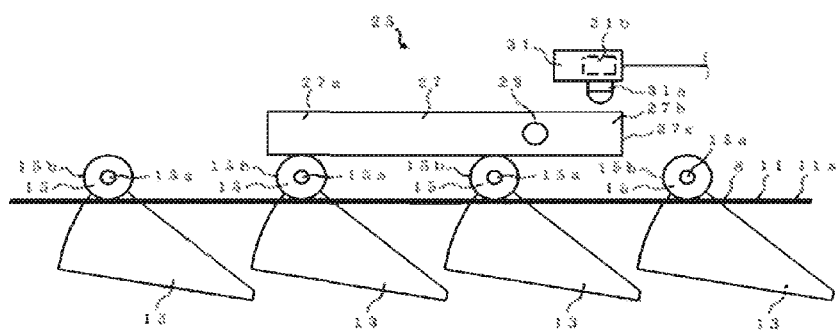
FIG. 2 is an enlarged view which shows a relevant part of the missing footstep detection device for a passenger conveyor when there is no opening in footsteps.
Figure 3:
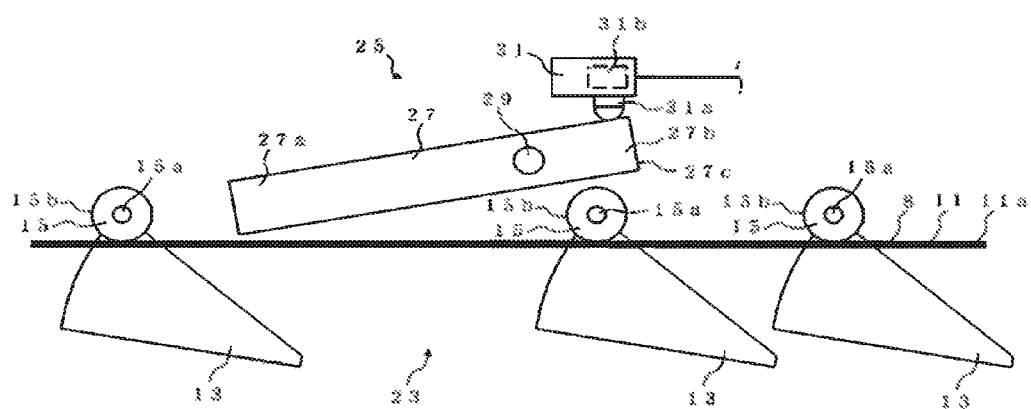
FIG. 3 is an enlarged view which shows the relevant part of the missing footstep detection device for a passenger conveyor when there is an opening in footsteps.

An embodiment of the present invention will be explained using FIG. 1 through FIG. 3. FIG. 1 is a diagram of an overall configuration of a missing footstep detection device for a passenger conveyor which shows Embodiment 1 of the invention. FIG. 2 is an enlarged view which shows a relevant part of the missing footstep detection device for a passenger conveyor when there is no opening in footsteps in a normal operation carrying passengers. FIG. 3 is an enlarged view which shows a relevant part of the missing footstep detection device for a passenger conveyor when there is an opening in footsteps in an operation carrying passengers.

In FIG. 1, an escalator 1 has a frame structure 3 which extends diagonally up and down between cross beams 2 provided in an upper floor and a lower floor. A boarding area 4 and a landing area 5 are provided at respective ends of the frame structure 3 in the upper floor and the lower floor. FIG. 1 is an example of ascending operation, where the boarding area 4 is on the lower floor and the landing area 5 is on the upper floor. The direction of operation can be reversed in descending operation, where the boarding area is on the upper floor and the landing area is on the lower floor.

Boarding and landing floors 7 are provided on the upper side of the frame structure 3 at the boarding area. 4 and the landing area 5. A rail 8 is installed inside the frame structure 3 and fixed to the frame structure 3. The rail 8 includes a forwarding rail 10 installed on the upper side along the inside of the frame structure 3, and a returning rail 11 installed on the lower side along the inside of the frame structure 3, namely, beneath the forwarding rail 10. The forwarding rail 10 and the returning rail 11 each include a portion formed linearly and a portion formed curvedly along the direction of operation of the escalator 1.

The forwarding rail 10 and the returning rail 11 are installed horizontally and linearly by a predetermined distance in the vicinity of the boarding and landing floor 7, are formed and installed curvedly at the position heading toward the next floor, namely the upper or lower floor, are formed linearly and installed diagonally up or down between the upper and the lower floors, and are installed curvedly, as making a U turn, beneath the boarding and landing floor 7.

Along the forwarding rail 10 and the returning rail 11, a plurality of footsteps 13 are coupled together into an endless circular shape. When the escalator 1 is viewed from the side, the footsteps 13 form a circular shape extending up and down so as to make a U turn beneath the boarding and landing floor 7.

In a normal operation carrying passengers, the footsteps 13 are coupled with each other at a regular interval in the part where passengers ride on so that the adjacent footsteps 13 have no opening between them so as to be continuous with each other. A roller 15 of a cylindrical shape is mounted to each of the footsteps 13 pivotally about a center shaft 15a. The footstep 13 is driven circularly, being guided by the forwarding rail 10 or the returning rail 11 while the roller 15 rolls around the center shaft 15a on a travelling surface 11a of the forwarding rail 10 or the returning rail 11. The footstep 13 is driven circularly, forming a circular shape in the upper and the lower direction, between the upper floor and the lower floor.

The footstep 13 moves horizontally by a specified distance in the vicinity of the boarding and landing floor 7, then moves curvedly toward the next floor, namely the upper or the lower floor, then linearly moves diagonally in the upper or the lower direction when heading toward the upper floor or the lower floor, and then makes a U turn, reversing upside down beneath the boarding and landing floor 7.

A machine room 17 is provided inside the upper floor side of the frame structure 3, which houses a driving device 19 and a control device 21. The footsteps 13 are driven by the driving device 19. The control device 21 controls the driving device 19. The escalator 1 operates or stops as the driving device 19 drives or stops the footsteps 13. When the control device 21 receives a signal which indicates detection of an opening 23 between the footsteps 13, the control device 21 controls the driving device 19 to stop the escalator 1.

A detection device 25 to detect the opening 23 between the footsteps 13 is installed above the returning rail 11 which is formed horizontally and linearly in the vicinity of the boarding and landing floors 7. The detection device 25 is installed at each side of the upper floor and the lower floor. The detection device 25 includes a detection member 27 of a straight bar shape. The detection member 27 is installed above the horizontally and linearly formed returning rail 11, and is also above the roller 15 that rolls in contact with the upper surface to move linearly, which is the traveling surface 11a of the linearly formed returning rail 11.

The detection member 27 is supported by a shaft 29 passing through an intermediate portion between a first end side 27a and a second end side 27b, penetrating the detection member 27 at the position nearer to the edge 27c of the second end side 27b than the gravity center of the detection member 27. The detection member 27 is rotatable about the shaft 29, and the first end side 27a and the second end side 27b can alternately approach, like a seesaw, the linear returning rail 11 therebeneath. When the first end side 27a approaches the returning rail 11, the second end side 27b ascends to distance itself away from the returning rail 11. When the first end side 27a distances itself away from the returning rail 11, the second end side 27b descends to approach the returning rail 11.

The shaft 29 is fixed to the frame structure 3 via a fixture (not illustrated) so as to be parallel to the center shaft 15a of the roller 15, and to keep the distance between the detection member 27 and the returning rail 11 so that the roller 15, rolling on the upper surface of the returning rail 11, can pass through therebetween.

The detection member 27 is arranged so that the first end side 27a can make contact with the outer peripheral surface 15b of the roller 15 passing through between the detection member 27 and the returning rail 11 beneath the detection member 27. Because the detection member 27 is disposed above the horizontally and linearly formed returning rail 11, the roller 15, passing through between the detection member 27 and the returning rail 11 therebeneath, moves linearly.

As the detection member 27 is supported by the shaft 29 at the position nearer to the edge 27c of the second end side 27b than the gravity center thereof, the portion ranging from the shaft 29 to the first end side 27a is heavier than the portion ranging from the shaft 29 to the second end side 27b. As the result of this, a downward force toward the returning rail 11 beneath the detection member 27 acts on the first end side 27a of the detection member 27, and an upward force against the returning rail 11 acts on the second end side 27b.

Therefore, the first end side 27a of the detection member 27 is biased toward the direction to make contact with the outer peripheral surface 15b of the roller 15 passing through between the first end side 27a of the detection member 27 and the returning rail 11 therebeneath. In other words, the first end side 27a of the detection member 27 is in contact, by the force generated from imbalance of the self-weight, with the outer peripheral surface 15b of each roller 15 rolling therebeneath.

In accordance with the operational direction of the escalator 1, ascending or descending, the roller 15 moves either from the first end side 27a of the detection member 27 toward the second end side 27b, or from the second end side 27b toward the first end side 27a. In FIG. 1 through FIG. 3, in a case of ascending operation for example, the roller 15 moves from the first end side 27a of the detection member 27 toward the second end side 27b. The direction of operation can be reversed. In a case of descending operation, the roller 15 moves from the second end side 27b toward the first end side 27a. The roller 15 moves linearly sliding against the first end side 27a.

Above the second end side 27b of the detection member 27, a switch 31 which transmits a signal to the control device 21 when the opening 23 is detected between the footsteps 13 is disposed. The switch 31 is arranged to transmit a signal when the second end side 27b of the detection member 27 depresses a button 31a of the switch 31. Since a latch mechanism 31b as a holding mechanism is included in the switch 31, once the button 31a is depressed, the signal continues to be transmitted.

While the roller 15 is passing through between the first end side 27a of the detection member 27 and the returning rail 11 therebeneath, the first end side 27a is in contact with the outer peripheral surface 15b of the roller 15. While the roller 15 is passing through beneath the detection member 27, the first end portion is biased to rotate in the direction approaching the returning rail 11 therebeneath. In a case where a roller 15 next to the concerned roller 15 approaches at a regular interval, when the next roller 15 has reached the position beneath the first end side 27a which is about to rotate, the first end side 27a makes contact with the outer peripheral surface 15b of the roller 15.

As explained above, the detection member 27 and the shaft are arranged so that the distance between the first end side 27a and the returning rail 11 therebeneath shall be kept equal to or larger than a predetermined distance. The switch 31 is arranged at a position where the button 31a shall not be depressed by the second end side 27b as long as the distance is kept equal to or larger than the predetermined one.

While the roller 15 is passing through between the first end side 27a of the detection member 27 and the returning rail 11 therebeneath, if the roller 15 next to the concerned roller 15 approaches at a longer interval than the regular interval, the first end side 27a rotates in the direction approaching the returning rail 11 therebeneath. Thus, the detection member 27 and the shaft 29 are arranged so that the distance between the first end side 27a and the returning rail 11 therebeneath shall be closer than the predetermined one. The switch 31 is arranged at the position where the button 31a shall be depressed by the second end side 27b and a signal shall be transmitted to the control device 21.

Because the detection device 25 is configured as illustrated above, the first end side 27a is biased, by the force generated from imbalance of the self-weight, to rotate in the direction approaching the linear returning rail 11 therebeneath. While the roller 15 is moving linearly rolling on the upper surface of the linear returning rail 11 beneath the first end side 27a, the first end side 27a cannot rotate in the direction approaching the linear returning rail 11 therebeneath because the first end side 27a and the outer peripheral surface 15b of the roller 15 are in contact with each other.

While the roller 15 is rolling on the upper surface of the linear returning rail 11 at a regular interval, the first end side 27b is kept unable to rotate in the direction approaching the linear returning rail 11 therebeneath because the first end side 27a gets in contact with the outer peripheral surface 15b of each roller 15 one after another. Because the detection device 27 is formed in a straight bar shape, the first end side 27a and the second end side 27b are kept in alignment almost parallel to the linear returning rail 11 therebeneath. The roller 15 moves along the linear returning rail 11, with its outer peripheral surface 15b being in contact with the first end side 27a, between the linear returning rail 11 and the first end side 27a which are almost in parallel with each other. Because the distance between the first end side 27a and the linear returning rail 11 therebeneath is kept equal to or larger than the predetermined one, the button 31a of the switch 31 shall not be depressed.

Because the roller 15 has a cylindrical shape, the outer peripheral surface 15b is always of the same round shape even if it rolls. Also, the roller 15 moves linearly rolling in contact with the linear returning rail 11. Consequently, because the first end side 27a comes in contact with the portion of the same round shape of the respective rollers 15, being kept in alignment almost parallel to the linear returning rail 11 therebeneath, the first end side 27b and the roller 15 can make a smooth contact.

When there is an opening 23 between the footsteps 13, the roller 15, together with the footsteps 13, rolls on the upper surface of the returning rail 11 at a longer interval than the regular interval in a normal operation. In this case, after the roller 15 which was in contact with the first end side 27b has passed, the next roller 15 will arrive after a longer interval than the regular interval. The first end side 27a, which has been kept in alignment almost parallel to the linear returning rail 11 therebeneath by being in contact with the outer peripheral surface 15b of the roller 15, rotates in the direction approaching the linear returning rail 11 therebeneath in the absence of the next roller 15 to make contact with.

And then, once the distance between the first end side 27a and the linear returning rail 11 therebeneath gets shorter than the predetermined one, the button 31a of the switch 31 shall be depressed by the second end side 27b, and a signal shall be transmitted to the control device 21. Receiving the signal, the control device 21 stops the driving of the footsteps 13 by the driving device 19. As explained above, because the opening 23 between the footsteps 13 can be detected with the simple structure, assembly and maintenance of the missing footstep detection device 25 for a passenger conveyor can be easily performed.

Also, as the detection device 25 is installed above the returning rail 11, maintenance work of the detection device 25 can be conducted easily by just removing the footsteps 13 in the forwarding side.

Also, the detection device 25 is reliable as a detection device because the detection member 27 can rotate itself by the force generated from imbalance of the self-weight, which is realized by disposing the detection member 27 above the roller 15, the direct detection target, and by pivotally supporting, at the position nearer to the second end side 27b than the gravity center of the detection member 27, the detection member 27 with the shaft 29 parallel to the direction of the center shaft 15a of the roller 15.

In FIG. 1, the detection device 25 is arranged so that the first end side 27a of the detection member 27 faces the upper floor direction and the second end side 27b faces the lower floor direction. Conversely, the detection device 25 may be arranged so that the first end side 27a faces the lower floor direction and the second end side 27b faces the upper floor direction.

Embodiment 2

While, in Embodiment 1, a detection device 27 which has a straight bar shape has been explained, in the present embodiment, a first end side 127a of a detection member 127 formed into a V shape so as to project against a linear returning rail 11 beneath the detection member 127 will be explained. The components of the same symbols as used in the other embodiment indicate the same components in the present embodiment and the explanation will be omitted.

Figure 4:
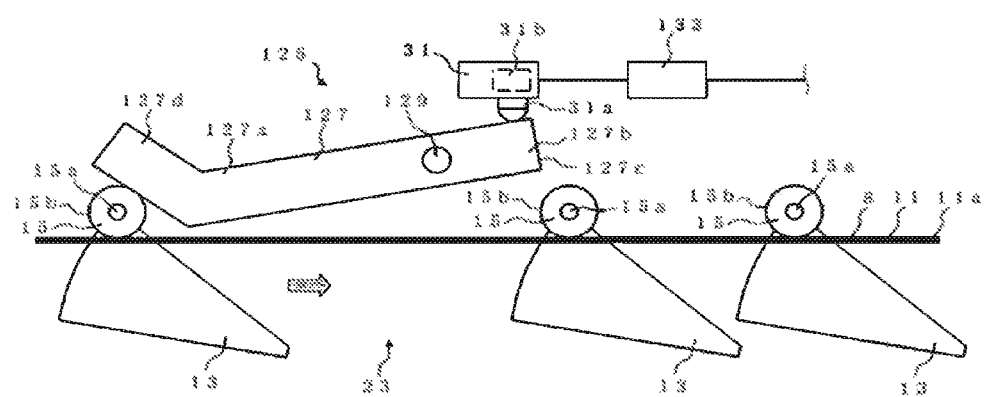
FIG. 4 is an enlarged view which shows a relevant part of a missing footstep detection device for a passenger conveyor in Embodiment 2 of the invention under maintenance.
Figure 5:
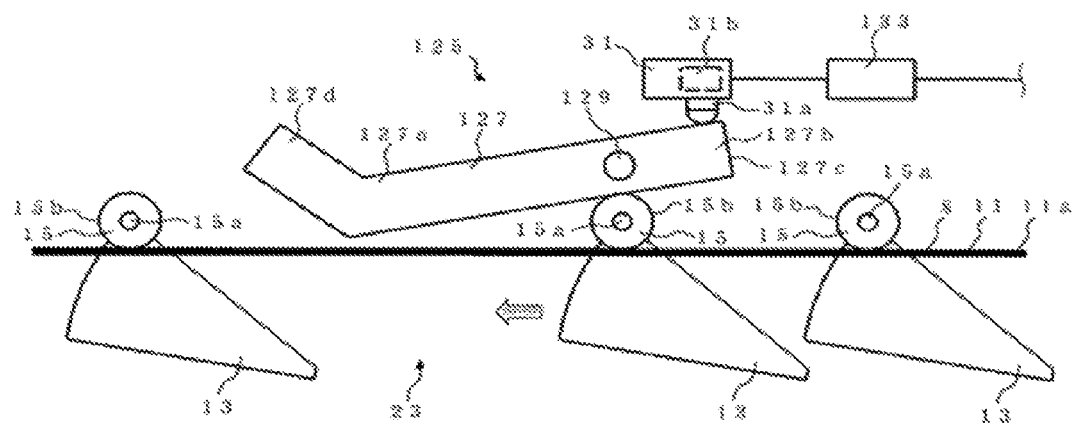
FIG. 5 is an enlarged view which shows the relevant part of the missing footstep detection device for a passenger conveyor in Embodiment 2 of the invention under maintenance.

FIG. 4 and FIG. 5 are enlarged views which both show relevant parts of a missing footstep detection device for a passenger conveyor in Embodiment 2 of the invention under maintenance where an opening 23 has arisen with part of footsteps 13 removed. As the operation direction is reversed between FIG. 4 and FIG. 5, the respective footsteps 13 move in the opposite directions.

In FIG. 4 and FIG. 5, while one of the footsteps 13 has been removed due to maintenance for example, and the opening 23 has arisen between the adjacent footsteps 13, a roller 15 is rolling on the upper surface of the linear returning rail 11.

The detection member 127 is disposed above the linear returning rail 11. The first end side 127a of the detection member 127 with a straight bar shape is formed into a V shape so as to project against the linear returning rail 11 therebeneath. The detection member 127 is supported by a shaft 129 at a position nearer to an edge 127c of a second end side 127b than the gravity center thereof, and is rotatable about the shaft 129. In a state where the opening 23 is beneath the first end side 127a and the first end side 127a has approached the linear returning rail 11 therebeneath, an acute angle is formed between an edge 127d of the first end side 127a and the returning rail 11, and the roller 15 rolling on a traveling surface 11a that is the upper surface of the returning rail 11 can be inserted therebetween.

Between a switch 31 above the second end side 127b of the detection member 127 and a control device 21 is disposed a repeater 133 functioning as a means to invalidate a signal. When the opening 23 between the footsteps 13 is detected and the first end side 127a approaches closer to the returning rail 11 therebeneath than the predetermined distance, the second end side 127b of the detection member 127 depresses a button 31a of the switch 31. With a latch mechanism 31b included in the switch 31, once the button 31a is depressed, the switch 31 continues to transmit the signal to the repeater 133 The repeater 133 is designed so that it can be set whether to transmit the signal received from the switch 31 to the control device 21 as is or not to transmit the signal to the control device 21 by interrupting it. In FIG. 4 and FIG. 5, the repeater 133 is set to interrupt the signal for operation during maintenance, for example, with a part of the footsteps 13 removed.

In a detection device 125 configured as illustrated above, when the opening 23 between the footsteps 13 comes beneath the first end side 127a of the detection member 127, the first end side 127a approaches closer to the returning rail 11 therebeneath than the predetermined, distance, which causes the second end side 127b to depress the button 31a of the switch 31 to transmit a signal to the repeater 133. With the latch mechanism 31b, the switch 31 continues to transmit the signal to the repeater 133. Because the signal is interrupted by the repeater 133 and is not transmitted to the control device 21, the footsteps 13 continue to move ahead continuously.

In FIG. 4, the footsteps 13 move from the first end side 127a toward the second end side 127b. As the opening 23 passes through beneath the first end side 127a, the roller 15 of the next footstep 13 is moving toward the edge 127d. Moving up to the position of the detection member 127, the roller 15 makes contact with the edge 127d at the outer peripheral surface 15b thereof, and is guided to be inserted between the edge 127d and the returning rail 11. As the roller 15 moves farther to push up the edge 127d, the first end side 127a moves upward so as to be distant from the returning rail 11. In this way, the roller 15 smoothly passes through between the detection member 127 and the returning rail 11.

In FIG. 5, the footsteps 13 move from the second end side 127b toward the first end side 127a. As the opening 23 passes through beneath the first end side 127a, the roller 15 of the next footstep 13 approaches the second end side 127b. The detection member 127 is in a state where the first end side 127a has approached closer to the returning rail 11 than a predetermined distance and, consequently, the second end side 127b has moved up to the position at which the above button 31a is depressed. Moving up to the position of the detection member 127, the roller 15 is guided between the second end side 127b and the returning rail 11. When moving farther, the roller 15 gets in contact with the first end side 127a of the detection member 127. The roller 15 pushes up the first end side 127a, and the first end side 127a moves upward so as to be distant from the returning rail 11. In this way, the roller 15 smoothly passes through between the detection member 127 and the returning rail 11.

The detection device 125 explained above allows the footsteps 13 to be continuously driven even during maintenance where the opening 23 has arisen due to the removal of part of the footsteps 13. This is because the repeater 133, which can be set whether to transmit the signal received from the switch 31 to the control device 21 as is, or not to transmit the signal to the control device 21 by interrupting it, is provided in the detection device 125. Suppose a case where the footsteps 13 are continuously driven with the opening 23 arisen and the detection member 127 has approached closer to the returning rail 11 therebeneath than the predetermined distance. Even in such a case, because the first end side 127a of the detection member 127 is formed into a V shape so as to project against the returning rail 11 therebeneath, the roller 15 can smoothly pass through between the detection member 127 and the returning rail 11 whichever direction either from the first end side 127a or from the second end side 127b the roller 15 may approach.

While, in Embodiment 1 and 2, the cases where the detection devices 25 and 125 are installed above the horizontally linear returning rails 11 have been explained, the detection device 25 or 125 can be installed at any position as long as the roller 15 passes through between the detection member 27 or 127 and the linearly formed rail 8. The same effect can be obtained even in a case where the detection device 25 and 125 are installed, for example, at a position where the rail 8 is inclined or above the forwarding rail 10.

Also, while, in Embodiment 1 and 2, the cases where the detection member 27 and 127 are supported by the shafts 29 or 129 at a position closer to the edges 27c or 127c of the second end sides 27b or 127b than their gravity centers have been explained, in order for the first end sides 27a and 127a to be biased toward the rails 8 therebeneath, springs for example can be arranged at the second end sides 27b and 127b.

Also, while, in Embodiment 1, the detection devices 25 and 125 are installed both at the upper floor side and at the lower floor side, they can be installed, as necessary, at a single location or at three locations or more.

Also, while, in Embodiment 1 and 2, the latch mechanism 31b as a holding mechanism to hold a state where the signal continues to be transmitted is arranged to the switch 31, a cam, for example, can be arranged between the second end side 27b or 127b and the switch so that the second end side 27b or 127b rotates the cam to depress the switch and to hold, by the cam, the state where the switch is depressed.

Also, while, in Embodiment 2, the repeater 133 is disposed between the switch 31 and the control device 21 as a means to invalidate a signal which will not stop operation of the passenger conveyor even when the signal indicating that an opening 23 has been detected is received, the means to invalidate the signal can be integrated into the control device 21.

Also, while, in Embodiment 2, the first end side 127a is formed into a V shape so as to project against the returning rail 11 in order to guide the roller 15 approaching the first end side 127a between the edge 127d of the first end side 127a and the returning rail 11, the first end side 127a can be of a smooth U shape, or can have a projection with which to ride on the outer peripheral surface 15b of the roller 15 which approaches the first end side 127a.

The invention claimed is:

1. A missing footstep detection device for a passenger conveyor installed in a passenger conveyor including a rail formed so as to have a linear portion and a curved portion, installed in a building; footsteps endlessly coupled at a regular interval, guided by the rail and a roller mounted to each of the footsteps to roll in contact with the rail, the detection device comprising:
   a detection member having a first end side and a second end side, that is pivotally supported about a shaft passing through an intermediate portion between the first end side and the second end side and parallel to a direction of a center shaft of rolling of the roller, and is disposed above the linear portion of the rail so that the first end side can make contact with an outer peripheral surface of the roller rolling on an upper surface of the linear portion of the rail;
   a biasing mechanism to bias the first end side to rotate toward the linear rail beneath the first end side; and
   a switch provided to transmit a signal in accordance with the rotation of the detection member due to the biasing.

2. The missing footstep detection device for a passenger conveyor according to claim 1, further comprising a signal invalidation unit to invalidate the transmitted signal.

3. The missing footstep detection device for a passenger conveyor according to claim 2, wherein the first end side is formed into a shape such that a roller approaching the first end side is guided into a space between the detection member and the rail while signals are invalidated and footsteps are moving circularly in the direction from the first end side toward the second end side.

4. The missing footstep detection device for a passenger conveyor according to claim 3, wherein, when viewed in the direction of the center shaft of rolling of the roller, the first end side is formed into a V shape so as to project against the rail beneath the detection member.

5. The missing footstep detection device for a passenger conveyor according to claim 1, wherein the switch comprises a holding mechanism to hold a state in which the signal continues to be transmitted.

6. The missing footstep detection device for a passenger conveyor according to claim 5, further comprising a signal invalidation unit to invalidate the transmitted signal.

7. The missing footstep detection device for a passenger conveyor according to claim 6, wherein the first end side is formed into a shape such that a roller approaching the first end side is guided into a space between the detection member and the rail while signals are invalidated and footsteps are moving circularly in the direction from the first end side toward the second end side.

8. The missing footstep detection device for a passenger conveyor according to claim 7, wherein, when viewed in the direction of the center shaft of rolling of the roller, the first end side is formed into a V shape so as to project against the rail beneath the detection member.

9. The missing footstep detection device for a passenger conveyor according to claim 1, wherein the biasing mechanism includes a spring arranged at the second end side.

10. The missing footstep detection device for a passenger conveyor according to claim 9, further comprising a signal invalidation unit to invalidate the transmitted signal.

11. The missing footstep detection device for a passenger conveyor according to claim 9, wherein the switch comprises a holding mechanism to hold a state in which the signal continues to be transmitted.

12. The missing footstep detection device for a passenger conveyor according to claim 11, further comprising a signal invalidation unit to invalidate the transmitted signal.

13. The missing footstep detection device for a passenger conveyor according to claim 1, wherein the detection member is pivotally supported at a position closer to an edge of the second end side than the gravity center of the detection member.

14. The missing footstep detection device for a passenger conveyor according to claim 13, further comprising a signal invalidation unit to invalidate the transmitted signal.

15. The missing footstep detection device for a passenger conveyor according to claim 14, wherein the first end side is formed into a shape such that a roller approaching the first end side is guided into a space between the detection member and the rail while signals are invalidated and footsteps are moving circularly in the direction from the first end side toward the second end side.

16. The missing footstep detection device for a passenger conveyor according to claim 15, wherein, when viewed in the direction of the center shaft of rolling of the roller, the first end side is formed into a V shape so as to project against the rail beneath the detection member.

17. The missing footstep detection device for a passenger conveyor according to claim 13, wherein the switch comprises a holding mechanism to hold a state in which the signal continues to be transmitted.

18. The missing footstep detection device for a passenger conveyor according to claim 17, further comprising a signal invalidation unit to invalidate the transmitted signal.

19. The missing footstep detection device for a passenger conveyor according to claim 18, wherein the first end side is formed into a shape such that a roller approaching the first end side is guided into a space between the detection member and the rail while signals are invalidated and footsteps are moving circularly in the direction from the first end side toward the second end side.

20. The missing footstep detection device for a passenger conveyor according to claim 19, wherein, when viewed in the direction of the center shaft of rolling of the roller, the first end side is formed into a V shape so as to project against the rail beneath the detection member.

\* \* \* \* \*